United States Patent [19]

Osanai et al.

[11] Patent Number: 4,571,061
[45] Date of Patent: Feb. 18, 1986

[54] IMAGE FORMING APPARATUS

[75] Inventors: Takenori Osanai, Ebina; Hideshi Oushiden, Kawasaki, both of Japan

[73] Assignee: Tokyo Shibaura Denki Kabushiki Kaisha, Kawasaki, Japan

[21] Appl. No.: 522,211

[22] Filed: Aug. 11, 1983

[30] Foreign Application Priority Data

Aug. 19, 1982 [JP] Japan ............... 57-143714

[51] Int. Cl.⁴ .............................. G03B 15/00
[52] U.S. Cl. ........................... 355/8; 355/57
[58] Field of Search ............. 355/14 C, 14 E, 56, 355/57, 61, 11, 8

[56] References Cited

U.S. PATENT DOCUMENTS

| | | | |
|---|---|---|---|
| 3,837,743 | 9/1974 | Ameniya | 355/60 |
| 3,946,222 | 3/1976 | Swanberg | 355/57 X |
| 4,126,389 | 11/1978 | Ikeda et al. | 355/8 |
| 4,209,248 | 6/1980 | Gibson et al. | 355/57 X |
| 4,264,198 | 4/1981 | Miyamoto | 355/57 |
| 4,361,395 | 11/1982 | Washio et al. | |
| 4,394,087 | 7/1983 | Irie et al. | 355/14 E |
| 4,420,248 | 12/1983 | Ogawa et al. | 355/57 |
| 4,494,866 | 1/1985 | Rattin et al. | 355/57 |
| 4,498,759 | 2/1985 | Ogawa et al. | 355/8 |

FOREIGN PATENT DOCUMENTS

3111557 4/1982 Fed. Rep. of Germany ........ 355/57

Primary Examiner—L. T. Hix
Assistant Examiner—D. Rutledge
Attorney, Agent, or Firm—Cushman, Darby & Cushman

[57] ABSTRACT

An image forming apparatus providing a continuously variable copy ratio. A first drive mechanism optically scans an original by moving a lamp. A second drive mechanism varies a distance (a) from the original to a lens of an optical system and also a distance (b) from the lens to the photosensitive drum. A third drive mechanism rotates the photosensitive drum. A control unit causes the second drive mechanism to make a ratio (b/a) between the distances (a) and (b) coincident with the specified copy ratio data input from a normal key group while an equation $1/a + 1/b = 1/f$ (f: a focal length of the lens) is satisfied and also causing the first and second drive mechanism to make the ratio of the speed of optical scanning to the ratio of the speed of movement of the photosensitive drum coincident with the specified copy ratio data.

13 Claims, 8 Drawing Figures

IMAGE FORMING APPARATUS

BACKGROUND OF THE INVENTION

This invention relates to an image forming apparatus and, more particularly, to an image forming apparatus capable of setting a desired copy ratio.

Recently, various electronic copiers capable of copying in reduced or enlarged sizes have been placed on the market.

Figure 1:
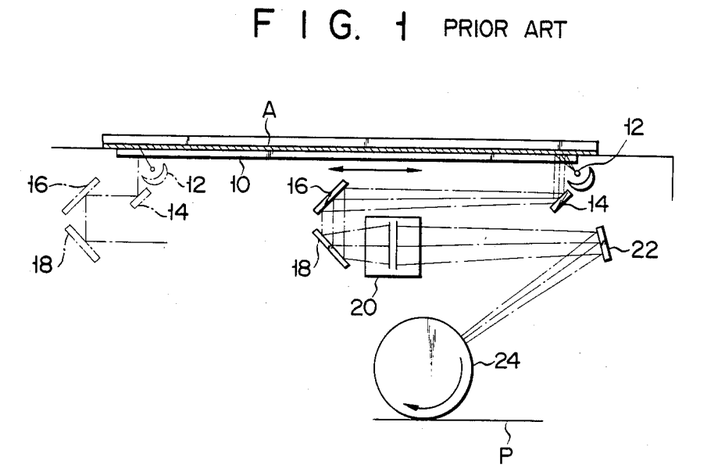
FIG. 1 is a schematic side view illustrating the operational principles of a prior art electronic copying apparatus.

The operational principles of the electronic copier will now be described with reference to FIG. 1. An original A set on an original table 10 is scanned for exposure by a scanning unit consisting of an exposure lamp 12 and a mirror 14. Light reflected from the original A is directed by mirrors 16 and 18, a lens 20 and a mirror 22 to a uniformly precharged rotating photosensitive drum 24. An electrostatic latent image is thus formed on the photosensitive drum 24. It is then developed, and the visible image (i.e., developer image) thus formed is transferred onto a copying sheet P to complete one copying cycle.

As for the copy size, the dimension of the copy in the scanning direction of the original, is determined by the ratio between the scanning speed of the scanning unit and the rotational speed of the photosensitive drum 24 (hereinafter referred to as speed ratio). The dimension of the copy in the direction perpendicular to the scanning direction is determined by the ratio between the distance a of the optical path from the original A to the lens 20 and the distance b of the optical path from the lens 20 to the photosensitive drum 24 (hereinafter referred to as optical path distance ratio). Of course the relation $1/a + 1/b = 1/f$ must be satisfied, where f is the focal distance of the lens 20.

The original A can be copied on a desired scale, enlarged or contracted, by varying the speed ratio and optical path distance ratio.

However, the mechanism for continuously varying the speed ratio and optical path distance ratio is complicated, and in the currently available copier the copy size can be enlarged or contracted only in a particular ratio. In other words, it sometimes happens that the copy size cannot be enlarged or contracted to the size of a given copying sheet P. If the size of the original is too small, it can be copied only on a portion of the copying sheet even on the limit enlarged scale. On the other hand, if the size of the original is too large, it cannot be fully copied on the copying sheet even on the limit contracted scale.

SUMMARY OF THE INVENTION

The invention is designate to overcome the deficiencies discussed above. An object of the present invention is to provide an image forming apparatus which produces any desired copy ratio (i.e., continuously variable) matched to the size of a given copying sheet which can be obtained through ready alteration of the speed ratio and optical path distance ratio.

According to one aspect of the invention, there is provided an image forming apparatus comprising an original table for setting an original thereon, an image carrier for forming an image of the original thereon, illuminating means for illuminating the original on the original table, an optical system for directing light reflected from the original illuminated from the illuminating means to the image carrier, the optical system including a single focus lens having a prescribed focal length (f) for focusing the reflected light on the image carrier, first means for optically scanning the original through relative movement of the original and the illuminating means by moving either the original or the illuminating means, second means for varying a distance (a) from the original to the lens and also a distance (b) from said lens to said image carrier, third means for moving the image carrier, fourth means for inputting data specifying a copy ratio, and fifth means for causing the second means to make a ratio (b/a) between the distances (a) and (b) coincident with the specified copy ratio data input from the fourth means while an equation $1/a + 1/b = 1/f$ is satisfied and also causing the first and third means to make the ratio of the speed of optical scanning to the speed of movement of the image carrier coincident with the specified copy ratio data.

According to another aspect of the invention, there is provided an image forming apparatus, which produces a preset number of copies of an original in a preset copy ratio by focusing the image of the original on an image carrier in said preset copy ratio, comprising, input means for inputting data specifying a copy ratio and data specifying a copy number, and selecting means for permitting the setting of the copy ratio specification data and copy number specification data to be done selectively from said input means.

DETAILED DESCRIPTION OF THE PREFERRED EMBODIMENT

One embodiment of the image forming apparatus according to the invention will now be described in detail with reference to FIGS. 2 through 8.

Figure 2:
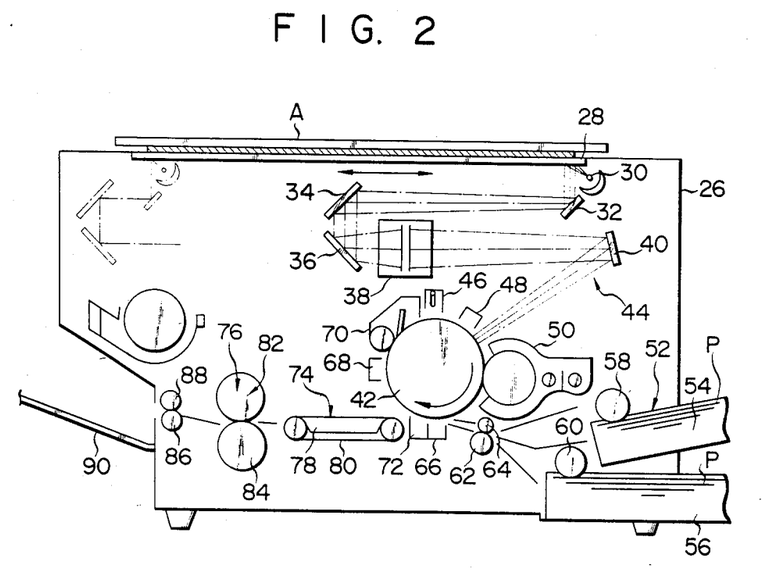
FIG. 2 is a schematic side view showing an electronic copying apparatus of one embodiment according to the invention.

FIG. 2 shows an electronic copying apparatus as an image forming apparatus having a housing 26. An original table 28 is secured to the top of the housing 26. An exposure lamp 30, mirrors 32, 34 and 36 and a lens 38 are provided beneath the original in table 28. They are reciprocated along the original table 28 for scanning an original A set thereon, effecting exposure. The mirrors 34 and 36 are moved at one half the speed of the mirror 32 to maintain a constant optical path length. Light reflected from the original A, illuminated from the exposure lamp 30, is reflected by the mirrors 32, 34 and 36 and passes through the lens 38. Light from the lens 38 is reflected by a further mirror 40 to a photosensitive drum 42 as an image carrier, whereby the light image of the original A is focused on the surface of the photosensitive drum 42. The exposure lamp 30, mirrors 32, 34 and 36, lens 38 and mirror 40 constitute an optical system 44.

The photosensitive drum 42 is rotated in a clockwise direction shown by the arrow in FIG. 2. The surface charge of the drum is removed as it proceeds past charge removal lamp 46. Then the surface is precharged as it proceeds past a precharger 48. The drum surface is then slit exposed to the light image of the original A, whereby an electrostatic latent image thereof is formed. The latent image is developed by toner into a visible image as the drum proceeds past a developing unit 50. A sheet feeder unit 52 is provided in one side wall of the housing 26. Copying sheets can be supplied one by one from the sheet feeder unit 52 to a lower portion of the photosensitive drum 42. The sheet feeder unit 52 includes two, i.e., upper and lower, sheet cassettes 54 and 56 each accommodating a plurality of copy paper P and capable of being removably mounted in the side wall of the housing 26, and feed rollers 58 and 60 for feeding out sheets P one by one from the respective sheet cassettes 54 and 56 and aligning rollers 62 and 64 for aligning a copying sheet P from either sheet cassette 54 or 56.

The aligned copying sheet P emerging between the aligning rollers 62 and 64 is led to a transfer section, which is between the photosensitive drum 42 and a transfer charger 66. In the transfer section, the copying sheet P is fed in close contact with the surface of the photosensitive drum 42, whereby the toner image is transferred from the drum 42 onto the sheet P by the action of the charger 66. Subsequent to the transfer, the photosensitive drum 42 is deprived of charge as it proceeds past a charge removal unit 68. Residual toner remaining attached to the photosensitive drum 42 is then removed as it proceeds past a cleaning unit 70, so that it returns to its initial state. Meanwhile, the copying sheet P, subsequent to the transfer, is separated from the drum 42 by the action of a sheet separation charger 72. The sheet P is then fed on by a transporter 74 to a fixing unit 76. The transporter 74 includes a pair of rollers, a perforated endless belt 80 passed round the rollers and a negative pressure chamber 78 provided under the upper run of the endless belt. In the fixing unit 76, the toner image which was transferred onto the copying sheet P is fixed as the sheet proceeds between a heat roller 82 and urging roller 84. Subsequent to the fixing, the sheet P is discharged by discharge rollers 86 and 88 to an outside discharged sheet tray 90.

Figure 6:
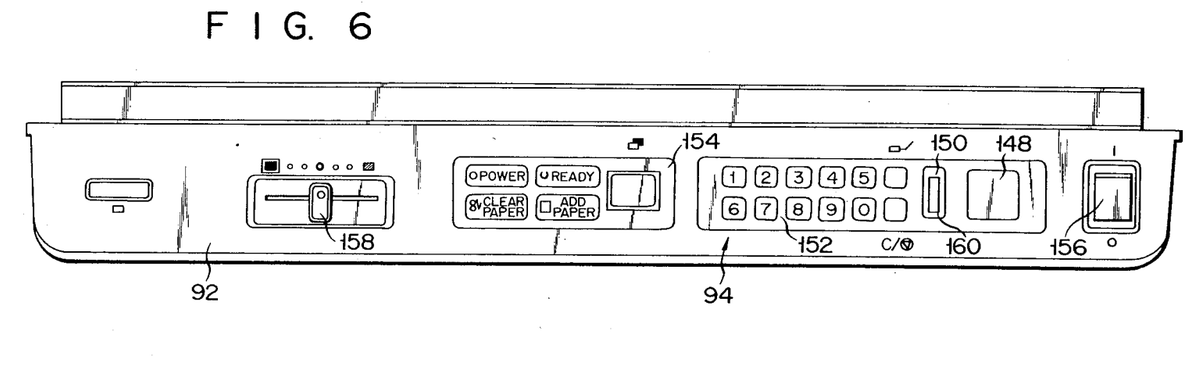
FIG. 6 is a plan view showing an input mechanism.

When a contracted or enlarged scale copy is desired, the desired copy ratio data is specified by an input mechanism 94 provided on a control panel 92 (FIG. 6). This input mechanism 94 will be described hereinafter as fourth means for copy ratio specification. After the copy ratio data is input, a first drive mechanism 96 (FIG. 3) as first means for scanning original A, a second drive mechanism 98 (FIG. 3) as second means for varying optical path length and a third drive mechanism 100 (FIG. 3) as third means for driving the photosensitive drum 42 are controlled accordingly.

The ratio of the copy in the scanning direction of the original A is changed by varying the speed ratio, i.e., the ratio between the speed of the exposure lamp 30 and mirror 32 (scanning speed), and the rotational speed of the photosensitive drum 42. The ratio of the copy in the direction perpendicular to the scanning direction is varied by varying the optical path distance ratio b/a, i.e., the ratio between the optical path distance a from the original A to the lens 38 and the optical path distance b from the lens 38 to the photosensitive drum 42. This is done by moving a second carriage 106, which carries the mirrors 34 and 36, and the lens 38. The specified copy ratio, either enlarged or contracted, can thus be obtained.

Figure 3:
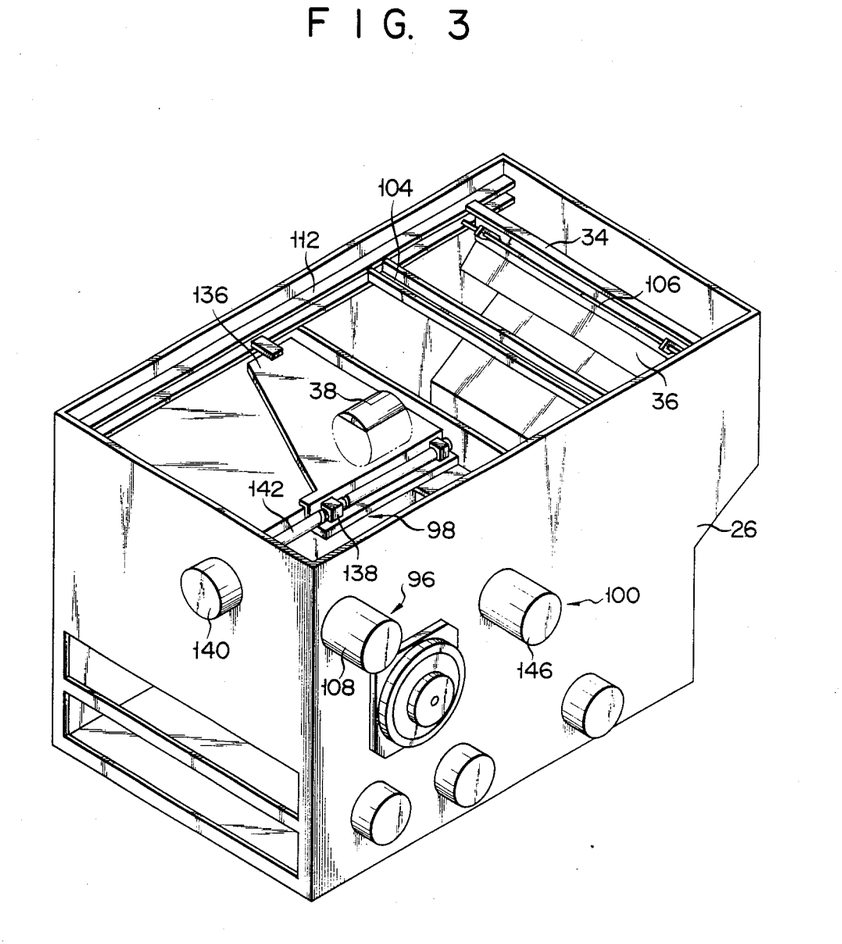
FIG. 3 is a perspective view of the electronic copying apparatus of FIG. 2, showing the internal construction thereof.

The mechanism relating to the variation of the speed ratio and the variation of the optical path distance ratio, which constitutes an important feature of the invention, will now be described. FIG. 3 is a perspective view of the copying apparatus of FIG. 2 with the original table 28 removed. The exposure lamp 30 and mirror 32 for scanning the original A are attached to and carried by a first carriage 104. The mirrors 34 and 36 are attached to and carried by the second carriage 106. The first and second carriages 104 and 106 are driven by a scanning motor 108, constituting a first drive mechanism, through a coupling mechanism such that carriage 106 is driven at one half the speed of carriage 104.

Figure 4:
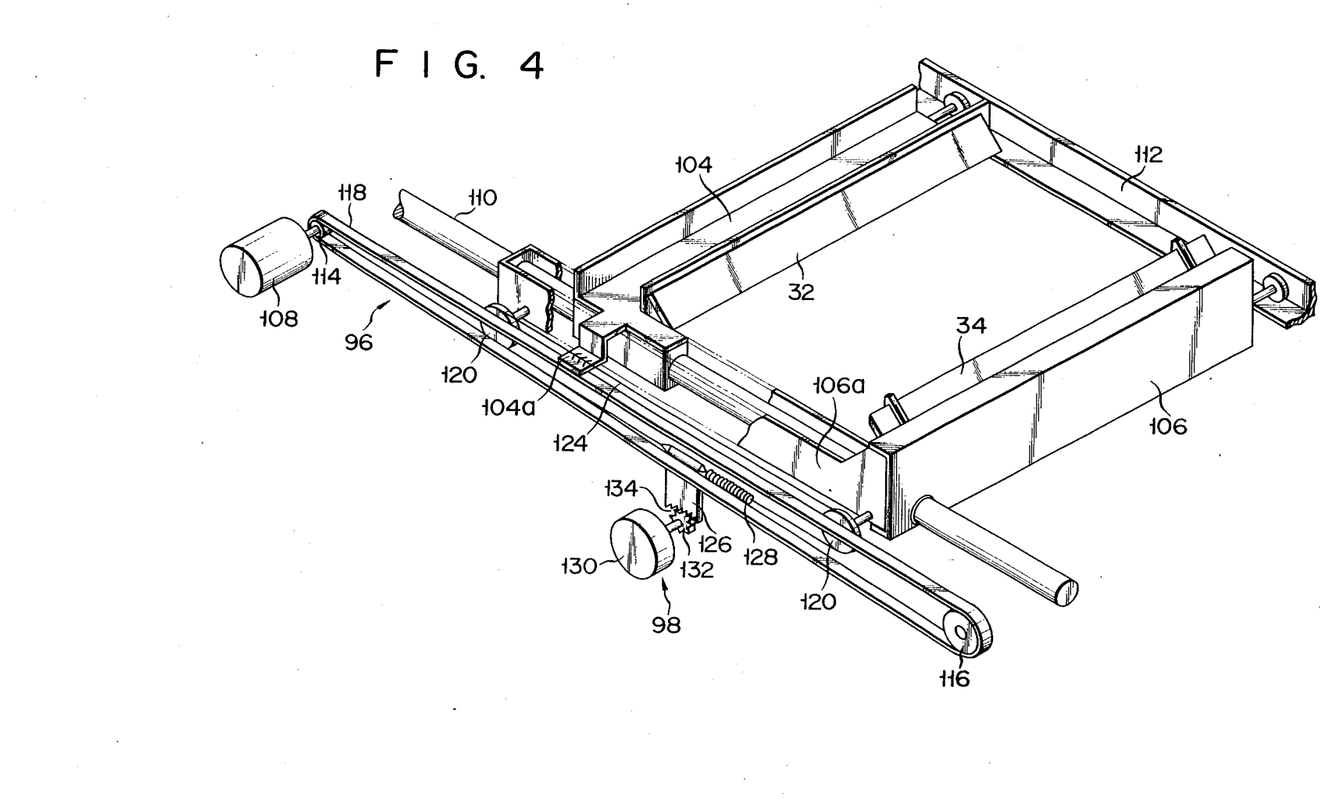
FIG. 4 is a perspective view showing a first drive mechanism.

As is shown in detail in FIG. 4, the first and second carriages 104 and 106 are reciprocally movable along a guide shaft 110 and a guide rail 112. On one side of the guide shaft 110, a drive pulley 114 driven by the scanning motor 108 and a driven pulley 116 are arranged. An endless belt 118 with teeth is passed round the pulleys 114 and 116. A portion of the belt 118 is secured to an extended portion 104a of the first carriage 104.

The second carriage 106 has a guide portion 106a extending along and supporting the guide shaft 110. The guide portion 106a carries a pair of pulleys 120 mounted at its opposite ends. A wire 124 is passed round the pulleys 120, one end of which is coupled to one side of a member 126 which is reciprocally movable along the guide shaft 110, while the other end is coupled to the other side of the member 126 via a spring 128. A portion of the wire 124 is secured to the extending portion 104a of the first carriage 104. The pulleys are movable such that the second carriage 106 is moved at one half the speed of the first carriage 104.

The member 126 has a rack 134 formed on its lower edge. The rack 134 is in mesh with a pinion 132 driven by a mirror drive motor 130. The second carriage 106 alone can thus be selectively moved by driving the mirror drive motor 130.

Figure 5:
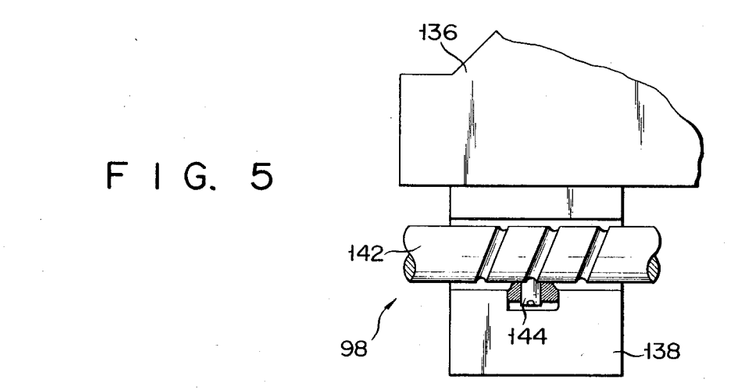
FIG. 5 is a fragmentary view showing part of a second drive mechanism.

The lens 38 is supported by a lens block 136 as shown in FIGS. 3 and 5. A cam follower 138 is secured to the lens block 136. The lens block 136 is driven from a lens drive motor 140 via the cam follower 138. The lens block 136 is moved forward or in reverse by the rotation of the lens drive motor 140 in the forward or reverse direction. The second carriage 106 is moved in a timed relation to the movement of the lens block 136. The mirror drive motor 130 and lens drive motor 140 constitute the second drive mechanism 98 for varying the optical path length. The cam follower 138 is coupled to a cam shaft 142 as shown in FIG. 5. The cam follower 138 has a cam follower piece 144, which is engaged in a helical groove formed in the cam shaft 142. Thus, with the rotation of the cam shaft 142 the lens block 136 is moved via the cam follower 138.

As shown in FIG. 3, the photosensitive drum 42 is driven by a drum drive motor 146, which is provided as the third drive mechanism 100 separately from the scanning motor 108, mirror drive motor 130 and lens drive motor 140. The individual motors 108, 130, 140 and 146 are controlled independently by an control unit 162 as a fifth means.

FIG. 6 shows control panel 92 which is manually operable. It has a start button 148 for starting a copying operation, a copy ratio setting button 150 for setting a copy ratio, a numeral key group 152, e.g., ten keys, for inputting magnification and copy number data, a display section 154 for displaying the input data, a power switch 156 and a copy density control lever 158. The copy ratio setting button 150 and numeral key group 154 constitute an input mechanism 94 for specifying a desired copy ratio. The copy ratio setting button 150 includes a lamp 160. The lamp 160 is "on" when it is ready to input magnification data from the key group 152, i.e., it is turned on when the copy ratio setting button 150 is depressed prior to the depression of the start button 148. It is turned off when the copy ratio setting button 150 is depressed once again.

Figure 7:
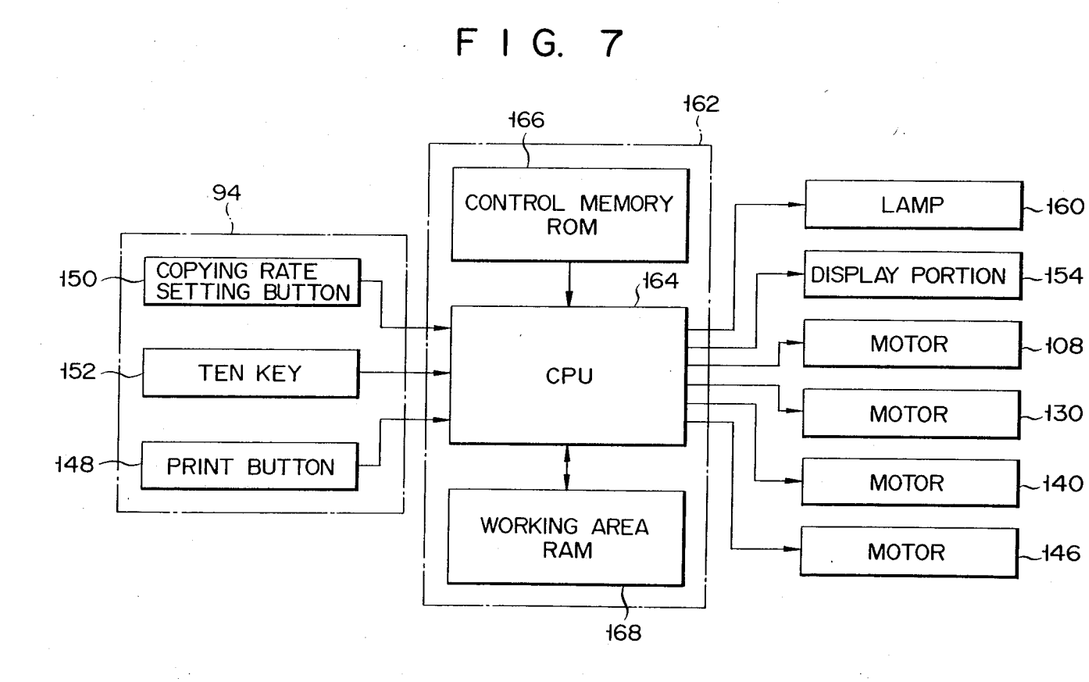
FIG. 7 is a block diagram showing a control unit according to the present invention.

The control unit 162, as shown in FIG. 7, is provided to permit copying of a given ratio through control of the four motors 108, 130, 140 and 146 independently of one another and to specify the repeat of a copying cycle. The control unit 162 includes a CPU (central processing unit) 164, a control memory 166 consisting of a ROM (read-only memory) and a working area 168 consisting of a RAM (random-access memory). The input mechanism 94 is connected to the CPU 164. The CPU 164 stores data from the input mechanism 94 in the working area 168 according to control data from the control memory 166, and controls the "on" or "off" state of the lamp 160, the display of data on the display section 154, and the driving of the motors 108, 130, 140 and 146 according to the stored data.

Figure 8:
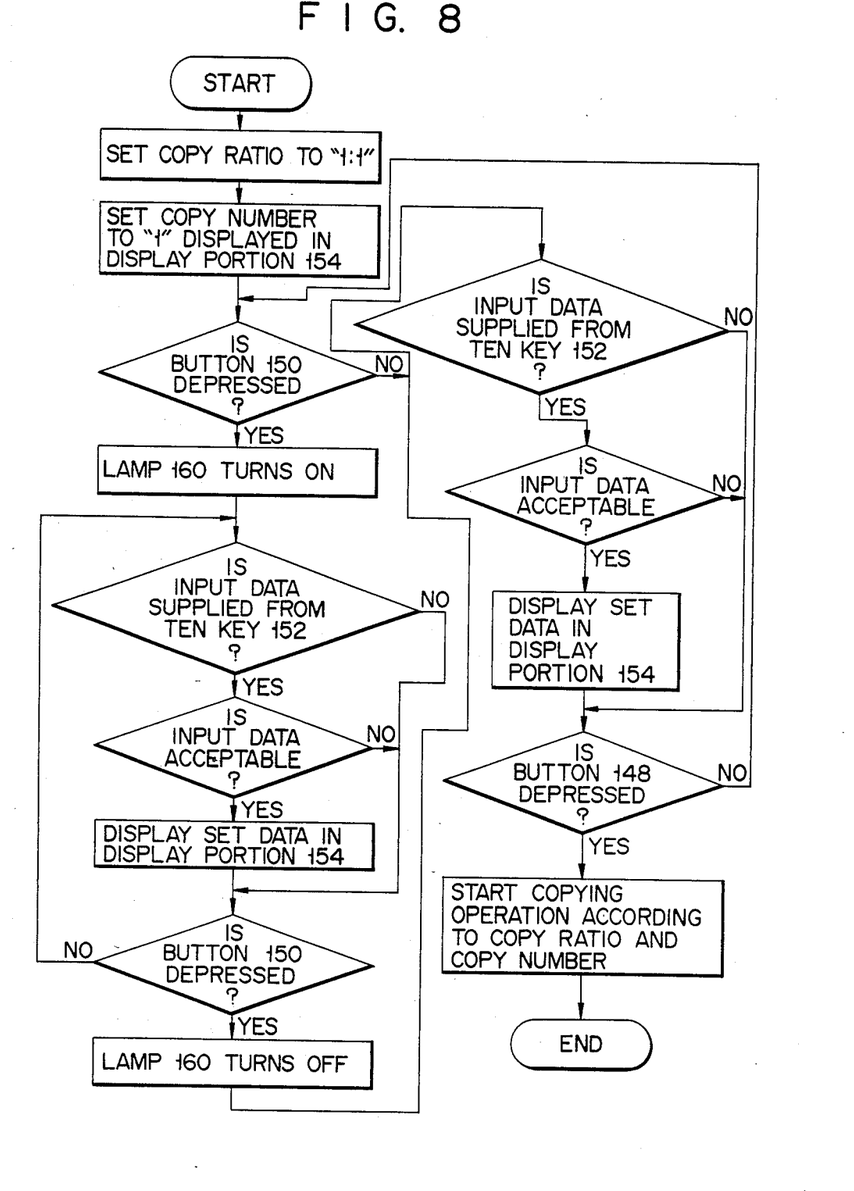
FIG. 8 is a flow chart for explaining the operation of the control unit of FIG. 7.

The control operation of the control unit 162 will now be described with reference to the flow chart of FIG. 8.

When the power switch 156 is turned on, the copy number is automatically set to "1". At the same time, the copy ratio is automatically set to "1:1" with the original size being equal to the desired copy size. These data are collectively displayed on the display section 154. In a subsequent step, a check is made as to whether the copy ratio setting button 150 is depressed. If the result of the check is "NO", i.e., if the copy ratio setting button 150 is not depressed, it is determined that there is to be not alteration of the copy ratio. Then the copy number data is checked. At this point a check is made as to whether the numeral key group 152 has been operated. If the numeral key group 152 has not been operated, it is determined that there is to be no alteration of the copy number. Subsequently, a check is made as to whether the start button 148 is depressed. If it is detected that the start button 148 is depressed, the CPU 164 starts the ordinary copying operation. If the start button 148 is not depressed, the routine returns to the step of the check as to whether the copy ratio setting button 150 is depressed as noted above.

When altering the copy ratio from the "1:1" ratio, the copy ratio setting button 150 is depressed. As a result, the check as to whether the copy ratio setting button 150 is depressed yields a "YES" (i.e., the check determines that the button is depressed). At the same time, the lamp 160 is turned on. The operator can confirm from the light coming out from the lamp 160 that the desired copy ratio data can now be input.

The numerical data of the desired copy ratio is then input by operating a key in the numeral key group 152 for each digit. In this embodiment, the copy ratio can be set in a range of 65 to 150% of the "1:1" ratio any other ratios are excluded. Every time the input numeral data digit is accepted, it is displayed on the display section 154. After the copy ratio data input operation is complete, the copy ratio setting button 150 is depressed again. As a result, the lamp 160 is turned off so that the operator can confirm that the copy ratio setting operation is over. The CPU 166 controls the driving of the motors 108, 130, 140 and 146 independently in conformity to the specified copy ratio. Unless the copy ratio setting button 150 is depressed again, the copy ratio setting operation is not over, and a check for the input of new numerical data is continued.

When the start button 148 is subsequently depressed without inputting any copy number data from the numeral key group 152, only a single copying cycle in the specified copy ratio occurs. When it is desired to alter the copy number, the desired copy number data is input by operating the numeral key group 152. At this time, the copy number data is input digit by digit. In this embodiment, the copy number can be set up to three digits, and data for the fourth and higher digits is excluded. Every time the input numerical data digit is accepted, it is displayed on the display section 154.

After the copy number setting operation is completed, the start button 148 is depressed. As a result the CPU 164 starts a copying operation in accordance with the specified copy ratio and copy number.

As has been described previously, when it is desired to set to a copy ratio other than the "1:1", the copy ratio setting button 150 is first depressed, then the desired copy ratio data is input by operating the numeral key group 152, and at this point the copy ratio setting button 150 is depressed once again. Subsequently, the desired copy number data is input from the numeral key group 152 before depressing the start button 146. The numerical data being input from the numeral key group 154 is progressively displayed on the display section 154 so that the operator can make a check as to whether the intended data is input correctly.

When the start button 145 is depressed with neither copy ratio nor copy number specified, the electronic copying apparatus is operated to produce only a single copy in the "1:1" ratio.

When the copy ratio is determined, the lens drive motor 140 and mirror drive motor 130, those motors constituting the second drive mechanism 98 for altering the dimension of the copy in the direction normal to the original scanning direction, are driven to move the lens block 136 and second carriage 106 to a position at which the ratio b/a between the optical path distance (a) from the original A to the lens 42 and the optical path distance (b) from the lens 38 to the photosensitive drum 42, i.e., the optical path distance, is equal to the specified one. In this case, the largest or smallest optical path distances are determined by the physical size of the copying apparatus. Further, the position of the lens 38 is determined for only a single lens. The movement distances can be readily calculated using, for instance, a microcomputer for the control and pulse motors for the lens and mirror drive motors 140 and 130. The lens block 136 and second carriage 106 can be accurately brought to given positions through the counting of pulses.

When the start button 148 is depressed, the original A set on the original table 28 is scanned by the movement of the first carriage 104, whereby an electrostatic latent image is formed on the photosensitive drum 42, as described earlier. The dimension of the copy in the scanning direction is determined by the speed ratio between the first carriage 104 and photosensitive drum 42. The first carriage 104 and photosensitive drum 42 are driven from independent motors, i.e., scanning motor 108 and drum drive motor 146, respectively. The speed ratio thus can be readily made equal to the specified one by controlling the rotational speeds of the motors 108 and 146. The motors 108 and 146 are pulse motors, and their speed ratio thus can be readily made equal to the specified one by varying the recurring frequencies of pulses supplied to these motors 108 and 146.

In the above embodiment, pulleys were used to obtain the speed ratio whereby the first carriage 104 traveled twice as fast as the second carriage 106. This speed ratio may also be obtained by providing an exclusive motor for driving the second carriage 106 separately from the scanning motor 108 and controlling the speed of the exclusive motor.

Further, it is possible to use a single motor along with an electromagnetic clutch in lieu of the lens drive motor 140 and scanning motor 108 irrespective of a deviation in the timing of operation between the lens block 136 and the first and second carriages 104 and 106. Further, the motors 108, 130, 140 and 146 are not limited to pulse motors, but any motors capable of speed control in an allowable error range may be used as well. Further, it is possible to drive the original base 28 instead of the first and second carriages 104 and 106 carrying the exposure lamp 30 and mirror 32 and mirrors 34 and 36.

Furthermore, while in the above embodiment the second carriage 106 carrying the mirrors 34 and 36 and the lens 38 was moved to vary the optical path distances, this is by no means the only method that can be employed. For example, a plurality of lenses may be provided for selective use depending on the magnification range. Alternatively, a correcting lens may be used with the lens 38 for varying the focal distance. Such an arrangement, with subsequent movement of the lens block 136 and second carriage 106, permits size reduction of the copying apparatus or increase of the copy ratio range. As a further modification, the mirror 40 may be moved instead of the second carriage 106.

Further, the numeral key group 152 may be replaced with a slide switch or rotary switch with the displacement thereof relating to the copy ratio and copy number.

Moreover, while the above embodiment concerns an electronic copying apparatus, the invention is generally applicable to any image forming apparatus in which an object to be copied is optically scanned to expose a moving image carrier to the optical image of the scanned object through an optical system and thereby obtain a copy of the object.

Also, various further changes and modifications are possible without departing from the scope and spirit of the invention.

As has been shown, with the image forming apparatus according to the invention, unlike the prior art image forming apparatus in which the copy ratio could be contracted or enlarged only in a limited range, it is possible to obtain any desired copy ratio matched to the size of the copying sheet through ready alteration of the speed ratio and optical path distance ratio.

In addition, the copy ratio specification data and copy number specification data can be input using a common input key unit, so that it is possible to simplify the construction and improve the operability of the image forming apparatus.

What is claimed is:

1. An image forming apparatus for obtaining any copy ratio within a predetermined continuously varying range of copy ratios comprising:
    a main body;
    an original table, connected to said main body, for receiving an original placed thereon;
    an image carrier for forming an image of said original thereon;
    illuminating means for illuminating said original on said original table,
    optical means, disposed in said main table, for directing light reflected to said original along an optical axis to said image carrier, said optical means including a single focus lens movable along said optical axis and having a fixed focal length (f) for focusing said reflected light on said image carrier;
    a first motor, disposed in said main body, for optically scanning said original through relative movement of said original and said illuminating means;
    a second motor, disposed in said main body, for varying a distance (a) from said original to said lens;
    a third motor for moving said single focus lens to vary a distance (b) from said lens to said image carrier;
    first means, connected to said main body, for inputting data specifying a copy ratio which is within said range of copy ratios;
    second means for causing said second motor and said third motor to change the distances (a) and (b) to make a ratio (b/a) coincident with said specified copy ratio data from said first means satisfying an equation $1/a + 1/b = 1/f$, and for causing said first motor to provide said relative movement at a speed in accordance with said specified copy ratio data, and for causing said third motor to move said single focus lens in accordance with said specified copy ratio data; and
    a fourth motor for driving said image carrier.

2. The image forming apparatus according to claim 1, wherein said original is stationary and said first motor moves said illuminating means to produce said relative movement.

3. The image forming apparatus according to claim 1, wherein said optical means further includes first, second and third mirrors for successively reflecting said reflected light from said original to said single focus lens, and a fourth mirror for reflecting said light from said single focus lens to said image carrier.

4. The image forming apparatus according to claim 3, wherein:
    said optical means further includes a first movable carriage integrally supporting said illuminating means and said first mirror, and a second movable carriage integrally supporting said second and third said mirrors.

5. The image forming apparatus according to claim 4, wherein;
    said first motor includes a scanning motor for driving said first carriage;
    said second motor includes a mirror drive motor for driving said second carriage; and
    said third motor includes a lens drive motor for driving said single focus lens.

6. The image forming apparatus according to claim 5, wherein said image carrier is a rotatable photosensitive drum.

7. The image forming apparatus according to claim 6, wherein said first means also is for setting a desired copy number.

8. An image forming apparatus which produces a preset number of copies of an original in a preset copy ratio by focusing an image of said original on an image carrier in said preset copy ratio, comprising:
  10-key input means for inputting data specifying a copy ratio and data specifying a copy number;
  selecting means for permitting the setting of the copy ratio specification data and copy number specification data to be done from said input means; and
  image producing means for producing said copies in a number and a copy ratio inputted from said 10-key input means.

9. The image forming apparatus according to claim 8, wherein said input means includes 10 numeral keys for inputting numeral data from "0" to "9" respectively, said copy ratio data and copy number data being input by operating said numeral keys.

10. The image forming apparatus according to claim 9, wherein said selecting means includes keys separate from said numeral keys.

11. The image forming apparatus according to claim 6 wherein said fourth motor includes an image drive motor.

12. The image forming apparatus according to claim 6 wherein said first, said second, said third, and said fourth motor each include a pulse motor.

13. An image forming apparatus according to claim 1 wherein said first means includes a 10-key input pad by which said specified copy ratio may be input as an integer within said range of copy ratios.

* * * * *

Notice of Adverse Decision in Interference

In Interference No. 101,926, involving Patent No. 4,571,061, T. Osanai, H. Oushiden, IMAGE FORMING APPARATUS, final judgment adverse to the patentees was rendered Jan. 29, 1990, as to claims 1-7 and 11-13.

(*Official Gazette May 8, 1990*)